Patented Dec. 26, 1950

2,535,943

UNITED STATES PATENT OFFICE 2,535,943

4 - AMINOBENZENE - SULFONAMIDES N'- ACYLATED WITH SUBSTITUTED CINNAMIC ACIDS

Henry Martin, Hans Gysin, and Otto Neracher, Basel, and Rudolf Hirt, Muri, near Bern, Switzerland, assignors to J. R. Geigy A.-G., Basel, Switzerland No Drawing. Original application May 1, 1944, Serial No. 533,658. Divided and this application June 4, 1947, Serial No. 752,558. In Switzerland May 6, 1943

4 Claims. (Cl. 260—397.7)

This is a divisional patent application to our copending patent application Ser. No. 533,658 of May 1, 1944, now U. S. Patent 2,435,974.

A process for the manufacture of p-aminobenzene sulfone acylamides has been described according to which sulfonamides of the benzene series or their salts containing in p-position a nitrogen-containing group are interacted with substituted carboxylic acids of the benzene series or with their functional derivatives being substituted by alkyl and/or alkoxy or alkylthio groups, preferably in the presence of catalysts or acid binding agents, and the p-positioned nitrogen group is eventually converted into an amino group. Furthermore the process described above has been extended to highly alkylated carboxylic acids of the benzene series as well as to carboxylic acids with condensed nuclei, which carboxylic acids are involved in the acylation.

Whereas hitherto exclusively compounds with aromatic or cyclic carboxylic acids have been described, we have now found that cinnamic acids which are indifferently substituted in α-position or in α- and β-position and which may further be indifferently substituted in the phenyl nucleus are also very suitable for the same purposes. As inert substituents may be understood those which are not capable of forming salts, that is to say which do not possess a manifest polar character, such as for instance halogens, alkoxy, aryloxy, alkyl, aryl groups, etc.; the new compounds differ from other acylated p-amino-benzene sulfonamides by their efficacy in checking the development of tubercle-bacilli.

As sulfonamides of the benzene series containing a nitrogen-containing group in p-position to the sulfonamide group there may be cited: p - amino - benzene sulfonamide, p - acylaminobenzene sulfonamide, p-nitrobenzene sulfonamide and the like. Instead of the nitro group any other group convertible by reduction into the amino group may be used, such as for example the nitroso, azo, azoxy or hydrazo group. Azomethine and acylamino groups may be converted into amino groups by hydrolysis. Advantageously those acyl radicals are selected which can again easily be split off. As such radicals the following may be for example enumerated: the acetyl or carbomethoxy radical which are again easily split off by a hydrolytical treatment without changing the acylated sulfonamide group.

Example 1

40.4 parts of p-nitrobenzene sulfamide are suspended in 200 parts of pyridine and, while stirring, 36.1 parts of α-methylcinnamoyl chloride are caused to drop thereinto. Then the mixture is heated for one hour on the water-bath, whereupon the solution is introduced under stirring into diluted hydrochloric acid; the little quantities of resin thus resulting are separated (by reprecipitation from sodium carbonate solution by means of hydrochloric acid) and the remaining mixture is reduced according to Béchamp. By recrystallisation from water and alcohol the 4-aminobenzene-N-(α-methylcinnamoyl)-sulfonamide of the melting point of 156°–158° C. is obtained.

According to the same process the analogous compounds may be prepared with the following acyl radical:

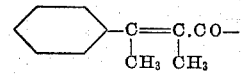

the resulting compound being non-crystallisable.

Beside the acid mentioned in this example the following carboxylic acids may be used: α-ethylcinnamic acid, α-propylcinnamic acid, α-methyl-β-ethylcinnamic acid, α:β-diethylcinnamic acid, etc.

Example 2

41.7 parts of α-ethyl-β-methylcinnamoyl chloride are dissolved in 200 parts of chlorobenzene or of another organic solvent and heated under reflux for 6 hours with 2 parts of copper powder and 42.8 parts of p-acetyl-amino-benzene sulfonamide. The chlorobenzene is blown off by means of steam, the residue dissolved in a sodium carbonate solution, filtered and the acetyl derivative is precipitated with mineral acid. Then the raw product is saponified with 2n caustic soda lye and the pure 4-aminobenzene-N-(α-ethyl - β - methylcinnamoyl) - sulfonamide having the melting point of 130° C. is obtained therefrom by recrystallisation from alcohol and water.

Beside the acids used in the foregoing examples the following acids are also suitable for the formation of substances with analogous properties: 4-chloro-α-methylcinnamic acid, 3:4-dimethyl-α-methylcinnamic acid, 3:4-dimethyl-α- phenylcinnamic acid, 4-chloro-α:β-dimethylcinnamic acid.

The cinnamic acids mentioned above and known for the greatest part can be prepared according to the usual methods for the manufacture of cinnamic acids.

In our parent application Ser. No. 533,658, now U. S. Patent 2,435,974 we have claimed certain β-alkyl-cinnamoyl-sulfanilamides. The present application claims analogous α-alkyl and α,β-di-alkyl-cinnamoyl-sulfanilamides.

What we claim is:

1. The p-amino-benzenesulfonamide of the formula

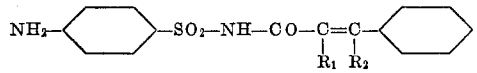

wherein $R_1$ represents a member selected from the group consisting of methyl and ethyl, $R_2$ represents a member selected from the group consisting of hydrogen and methyl.

2. The p-amino-benzene-sulfonamide of the formula

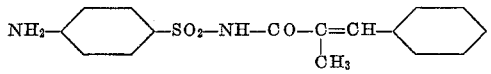

3. The p-amino-benzene-sulfonamide of the formula

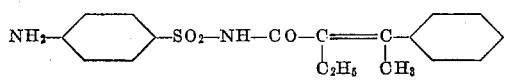

4. The p-amino-benzene-sulfonamide of the formula

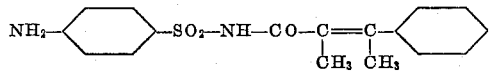

HENRY MARTIN.
HANS GYSIN.
OTTO NERACHER.
RUDOLF HIRT.

REFERENCES CITED

The following references are of record in the file of this patent:

UNITED STATES PATENTS

| Number | Name | Date |
|---|---|---|
| 2,435,974 | Martin et al. | Feb. 17, 1948 |

OTHER REFERENCES

Crossley et al.: "J. Am. Chem. Soc.," vol. 61, October 1939, pages 2950 to 2955.